T. WEBB.
Binder-Attachments for Harvesters.

No. 138,771.  Patented May 13, 1873.

Witnesses.
H. Poole.
Hen. Cormick

Inventor,
Thomas Webb,
By J. McC. Perkins, Atty.

UNITED STATES PATENT OFFICE.

THOMAS WEBB, OF FREEPORT, ILLINOIS.

IMPROVEMENT IN BINDERS' ATTACHMENTS FOR HARVESTERS.

Specification forming part of Letters Patent No. 138,771, dated May 13, 1873; application filed September 23, 1872.

*To all whom it may concern:*

Be it known that I, THOMAS WEBB, of Freeport, in the county of Stevenson and State of Illinois, have invented certain new and useful Improvements in Binders' Table of Grain-Harvesters; and I do hereby declare that the following is a full, clear, and exact description thereof, that will enable others skilled in the art to which it appertains, to make and use the same, reference being had to the accompanying drawing and to the letters of reference marked thereon which form a part of this specification.

The nature of my invention consists in the arrangement with the ordinary binders' tables of a grain-harvester, of an additional table and a detachable platform supported upon an additional wheel, as will be hereinafter more fully set forth.

In order to enable others skilled in the art to which my invention appertains to make and use the same, I will now proceed to describe its construction and operation, referring to the annexed drawing, in which—

Figure 1:
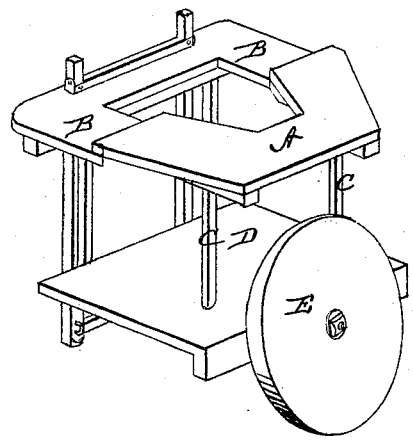
Figure 2:
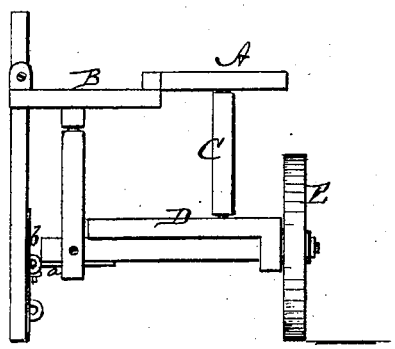
Figure 3:
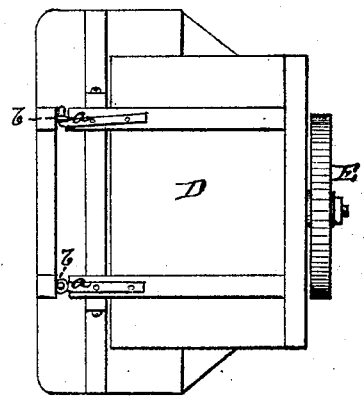

Figure 1 is a perspective view, Fig. 2 a front view, and Fig. 3 is a bottom view, of so much of the machine as will fully illustrate my improvements.

A represents the additional table, which is situated on the outer side of the other two tables B B, and is attached to them by bolts or screws at each end, and is sustained in a horizontal position by two perpendicular rods, C C. These rods are tenoned in loose mortises to accommodate the rise and fall of the table as the machine passes over rough and uneven ground, and are inserted in and rest on the platform D, upon which the binders stand.

In working with this attachment on the harvester the two original binders, after obtaining their gavels, turn with their faces one to the front and the other to the rear of the machine, while the one in the center at the attached table A faces about, bringing his gavel between the other two without interfering with them in the least, finishing his work in the same manner as the others.

It has been found utterly impossible for two men to bind the grain in a thorough manner as fast as it is cut, but when there are three it can be done with ease; hence the importance of this additional table.

E represents the additional wheel running on the outside of the machine and supporting one end of the platform D. By this means part of the weight of the binders is transferred from the machine to the wheel; in fact, without it the other parts would be almost impracticable, from the fact that the harvesters are adapted for two binders only, and any additional weight — say, a binder — placed upon their hanging platforms would raise the grain-wheel, and consequently the sickle-bar, completely out of the grain. The platform D is attached to the harvester by means of hooks *a a* bolted to the frame of the platform, the one in the rear being horizontal, and is inserted in a cast or wrought iron projection, *b*, bolted to the lower part of the frame of the harvester and pierced with three or more holes for the hook. These holes are to accommodate the raising or lowering of the sickle-bar, and thus obviating the necessity of using a wrench and loss of time on all such occasions, yet preserving the evenness of the platform and consequently of the tables. The front hook is precisely the same as the rear one, except that it is perpendicular instead of horizontal.

By this simple arrangement the operator can in a moment, without a wrench or other implement, detach the platform from the machine, the tables being raised up perpendicularly and fastened there. The machine can then be moved through any gate, opening, or other narrow space not otherwise accessible, and all can be accomplished with the loss of but a few moments of time.

Having thus fully described my invention, what I claim as new, and desire to secure by Letters Patent, is—

The combination of the tables A and B B, platform D, and wheel E, when said parts are constructed and arranged substantially in the manner and for the purposes herein set forth.

In testimony that I claim the foregoing I have hereunto set my hand this 18th day of September, 1872.

THOMAS WEBB.

Witnesses:
CHRISTIAN PATON,
BERNARD BEHRENDS.